United States Patent
Gehring et al.

(10) Patent No.: US 7,195,555 B2
(45) Date of Patent: Mar. 27, 2007

(54) AIR DUCT OUTLETS HAVING RETURN AIR PASSAGEWAYS THAT FACILITATE OSCILLATING AIR FLOW

(75) Inventors: Thomas F. J. Gehring, Scarborough (CA); Ireneusz Jankowski, Richmond Hill (CA); Dejan Havidic, Toronto (CA); Jeffrey A. McKerrall, Toronto (CA); Douglas Lim Hester, Scarborough (CA)

(73) Assignee: Collins & Aikman Products Co., Troy, MI (US)

( * ) Notice: Subject to any disclaimer, the term of this patent is extended or adjusted under 35 U.S.C. 154(b) by 63 days.

(21) Appl. No.: 11/047,262

(22) Filed: Jan. 31, 2005

(65) Prior Publication Data

US 2005/0176363 A1    Aug. 11, 2005

(51) Int. Cl.
    B60H 1/34 (2006.01)
(52) U.S. Cl. ............... 454/153; 454/152; 454/155
(58) Field of Classification Search ........... 454/121, 454/143, 152, 153, 155
    See application file for complete search history.

(56) References Cited

U.S. PATENT DOCUMENTS

| | | | | |
|---|---|---|---|---|
| 4,266,722 A | * | 5/1981 | Nawa et al. | 239/590.5 |
| 4,407,186 A | * | 10/1983 | Izumi et al. | 454/153 |
| 5,259,815 A | * | 11/1993 | Stouffer et al. | 454/125 |
| 5,514,035 A | * | 5/1996 | Denniston | 454/121 |
| 6,179,708 B1 | * | 1/2001 | Yamamoto et al. | 454/153 |
| 6,840,852 B2 | * | 1/2005 | Gehring et al. | 454/153 |
| 6,887,148 B2 | * | 5/2005 | Biasiotto et al. | 454/121 |
| 6,902,474 B2 | * | 6/2005 | Gehring et al. | 454/153 |

* cited by examiner

Primary Examiner—Derek S. Boles
(74) Attorney, Agent, or Firm—Myers Bigel Sibley & Sajovec

(57) ABSTRACT

An air duct outlet includes a housing having spaced-apart top and bottom walls, and spaced-apart first and second side walls extending between the top and bottom walls to define an air passageway having an inlet and outlet. A first air return passageway is located adjacent to the first side wall, and diverts a portion of an air stream flowing through the air passageway as the air stream adheres to the first side wall. A second air return passageway is located adjacent to the second side wall, and diverts a portion of an air stream flowing through the air passageway as the air stream adheres to the second side wall. The continuous diversion of portions of an air stream flowing through the air passageway by the first and second air return passageways causes an oscillating, sweeping motion of the air stream as it exits from the air passageway outlet.

12 Claims, 6 Drawing Sheets

AIR DUCT OUTLETS HAVING RETURN AIR PASSAGEWAYS THAT FACILITATE OSCILLATING AIR FLOW

RELATED APPLICATION

This application claims the benefit of U.S. Provisional Application No. 60/542,152 filed Feb. 5, 2004, the disclosure of which is incorporated herein by reference in its entirety as if set forth fully herein.

FIELD OF THE INVENTION

The present invention relates generally to vehicles and, more particularly, to air duct outlets utilized within vehicles.

BACKGROUND OF THE INVENTION

Conventionally, vehicle interiors are provided with one or more air duct outlets which are connected by ducts to an outside air source and/or to a heating and/or air conditioning system that provides cooled and/or heated ("conditioned") air. Because it is generally desirable for vehicle occupants to be able to adjust the direction of air flow within a vehicle interior, air duct outlets are typically provided with adjustable vanes or louvers. In addition, air duct outlets may be provided with dampers that allow vehicle occupants to control the amount of air flowing therethrough.

Conventional air duct outlets typically utilize one or more sets of louvers to mechanically redirect an air stream flowing therethrough. While this technology is proven and successful, louver assemblies can be complex and expensive to manufacture. In addition, conventional air duct outlets typically provide an air stream deflection range up to only about 90° (i.e., −45° to +45° relative to a centerline of the flow direction of an air stream). Air stream deflection ranges in excess of ±45° in conventional air duct outlets typically result in large pressure drops and lower air flow rates, which are undesirable.

In addition, air duct outlets are conventionally designed to allow the passage of a large amount of air so that the cabin of a vehicle can be cooled/heated as rapidly as possible. However, passengers typically can tolerate relatively high airflow rates only for a limited time before starting to feel uncomfortable. This problem has been addressed by the use of oscillating air duct outlets wherein the oscillation of a set of louvers causes an air stream flowing therethrough to oscillate or sweep back and forth such that a passenger experiences direct airflow only for limited durations. For example, the Mazda 626 automobile incorporates an oscillating air duct outlet. This air duct outlet uses a small, dc motor (geared down to low rotational speed) to drive a crank which, through a shaft, mechanically moves air-directing louvers back and forth in an oscillating pattern, thereby imparting a sweeping motion to an air stream.

Unfortunately, the use of motors and associated rotational linkages to generate oscillating air stream motion can be somewhat complicated and expensive. Vehicle manufacturers are continuously seeking components, such as air duct outlets, that have enhanced functionality (such as oscillation capability) and durability, yet are cost effective to manufacture. Vehicle manufacturers are also continuously seeking components, such as air duct outlets, that can enhance styling within a vehicle, yet remain functional and economical.

SUMMARY OF THE INVENTION

In view of the above discussion, an air duct outlet, according to embodiments of the present invention, includes a housing having spaced-apart top and bottom walls, and spaced-apart first and second side walls extending between the top and bottom walls to define an air passageway having an inlet and outlet. The side walls diverge in a downstream direction and may have a generally linear configuration, a convexly curved configuration, or a configuration that includes linear and convexly curved portions. A first air return passageway is located adjacent to the first side wall and is configured to divert a portion of an air stream flowing through the air passageway as the air stream adheres to the first side wall via the "Coanda effect." The first air return passageway directs the diverted air stream portion into the air passageway at a location between the inlet and outlet and at an angle substantially transverse to a direction of the air stream. This diverted air stream portion pushes the air stream away from the first side wall and toward the second side wall, thus causing the air stream to move and adhere to the second side wall.

A second air return passageway is located adjacent to the second side wall and is configured to divert a portion of the air stream flowing through the air passageway as the air stream adheres to the second side wall. The second air return passageway directs the diverted air stream portion into the air passageway at a location between the inlet and outlet and at an angle substantially transverse to a direction of the air stream. This diverted air stream portion pushes the air stream away from the second side wall and toward the first side wall, thus causing the air stream to move and adhere to the first side wall.

The continuous diversion of portions of an air stream flowing through the air passageway by the first and second air return passageways causes an oscillating, sweeping motion of the air stream as it exits from the air passageway outlet. According to embodiments of the present invention, the first and second air return passageways are U-shaped channels having respective inlets and outlets in communication with the air passageway. According to other embodiments, the first and second air return passageways are respective tubes having respective inlets and outlets in communication with the air passageway.

BRIEF DESCRIPTION OF THE DRAWINGS

The accompanying drawings, which form a part of the specification, illustrate embodiments of the present invention. The drawings and description together serve to fully explain the invention.

DETAILED DESCRIPTION OF THE INVENTION

Figure 1:
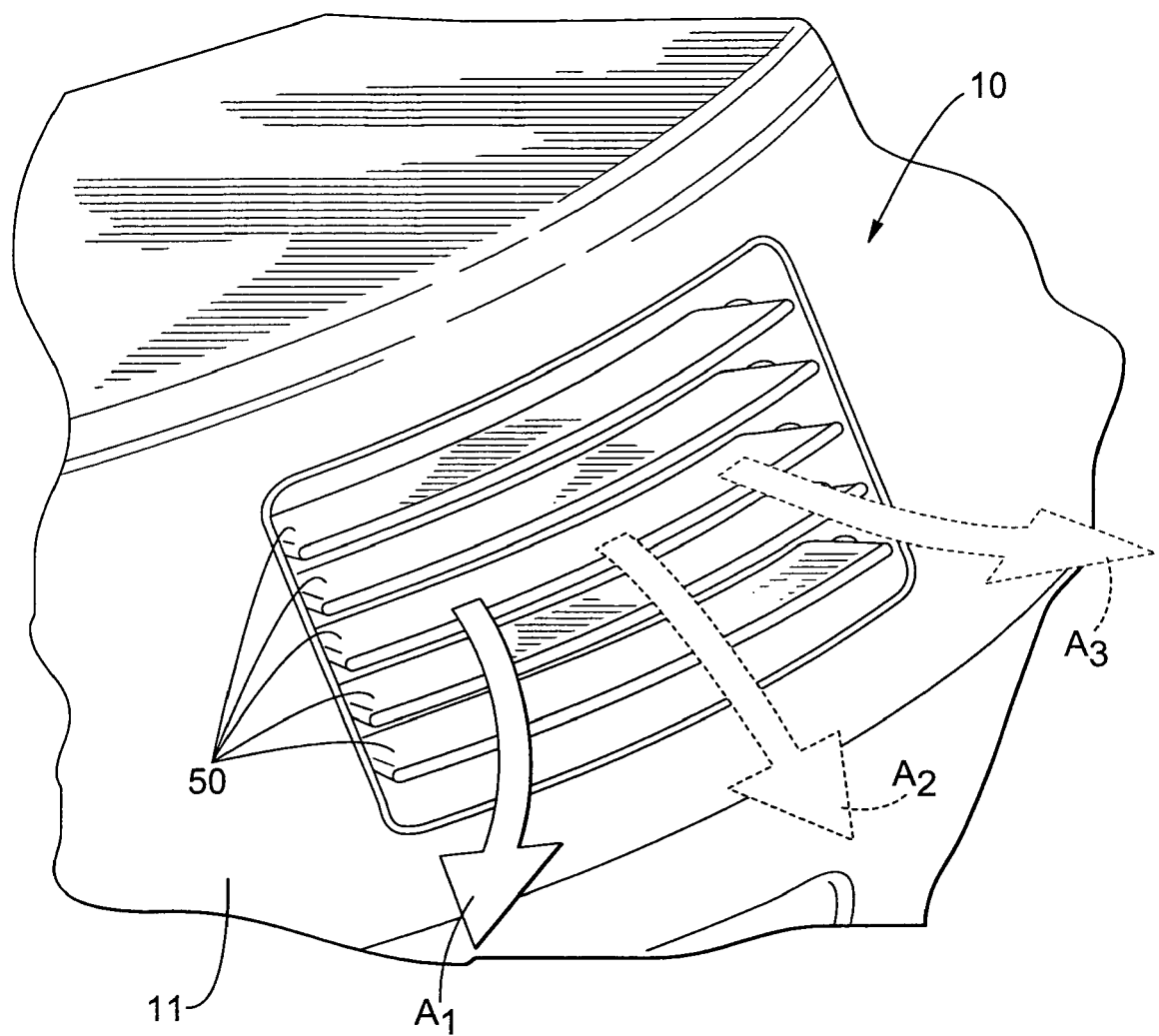
FIG. 1 is a front, perspective view of an air duct outlet mounted within an instrument panel of a vehicle, according to embodiments of the present invention.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings, the thickness of lines, layers and regions may be exaggerated for clarity. It will be understood that when an element is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. The terms "upwardly", "downwardly", "vertical", "horizontal" and the like are used herein for the purpose of explanation only.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, the term "and/or" includes any and all combinations of one or more of the associated listed items.

Referring to FIGS. 1–8, an air duct outlet 10, that imparts an oscillating, sweeping motion to an air stream flowing therethrough, according to embodiments of the present invention, is illustrated. The illustrated air duct outlet 10 is designed for use within the interior compartments of vehicles, such as automobiles, trucks, trains, boats, aircraft, and the like. However, it is understood that air duct outlets according to embodiments of the present invention may be utilized in various environments (e.g., in homes and offices) and are not limited only to use within vehicles.

In FIG. 1, air duct outlet 10 is installed within the instrument panel 11 of a vehicle. Arrows $A_1$, $A_2$, $A_3$ indicate the range of directions of an air stream exiting the air duct outlet 10 in an oscillating, sweeping motion. The illustrated air duct outlet 10 includes a plurality of generally horizontal vanes or louvers 50 that allow a user to adjust up and down directions of an oscillating, sweeping air stream exiting from the air duct outlet 10. Embodiments of the present invention are not limited to the illustrated louvers 50. Louvers of various shapes, sizes and orientation can be utilized in accordance with embodiments of the present invention. Moreover, embodiments of the present invention do not require louvers.

Figure 2:
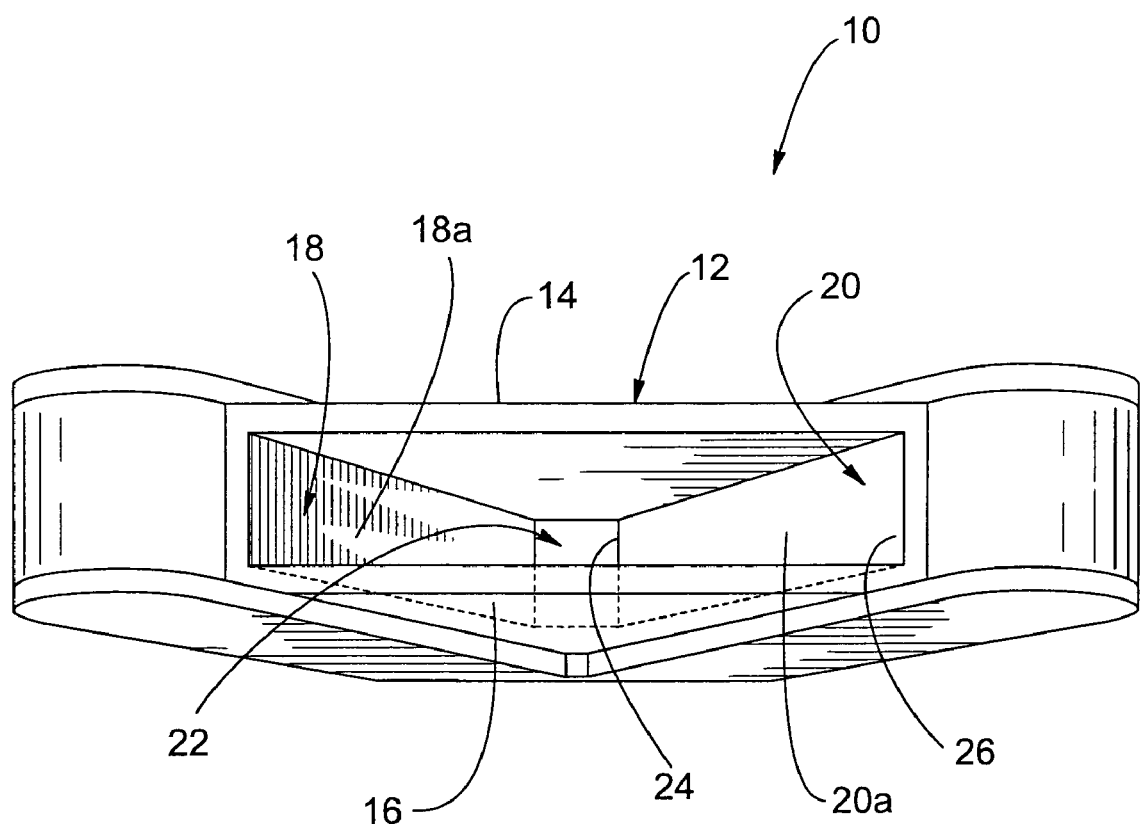
FIG. 2 is a front perspective view of the air duct outlet of FIG. 1 that illustrates a V-shaped air passageway.
Figure 4:
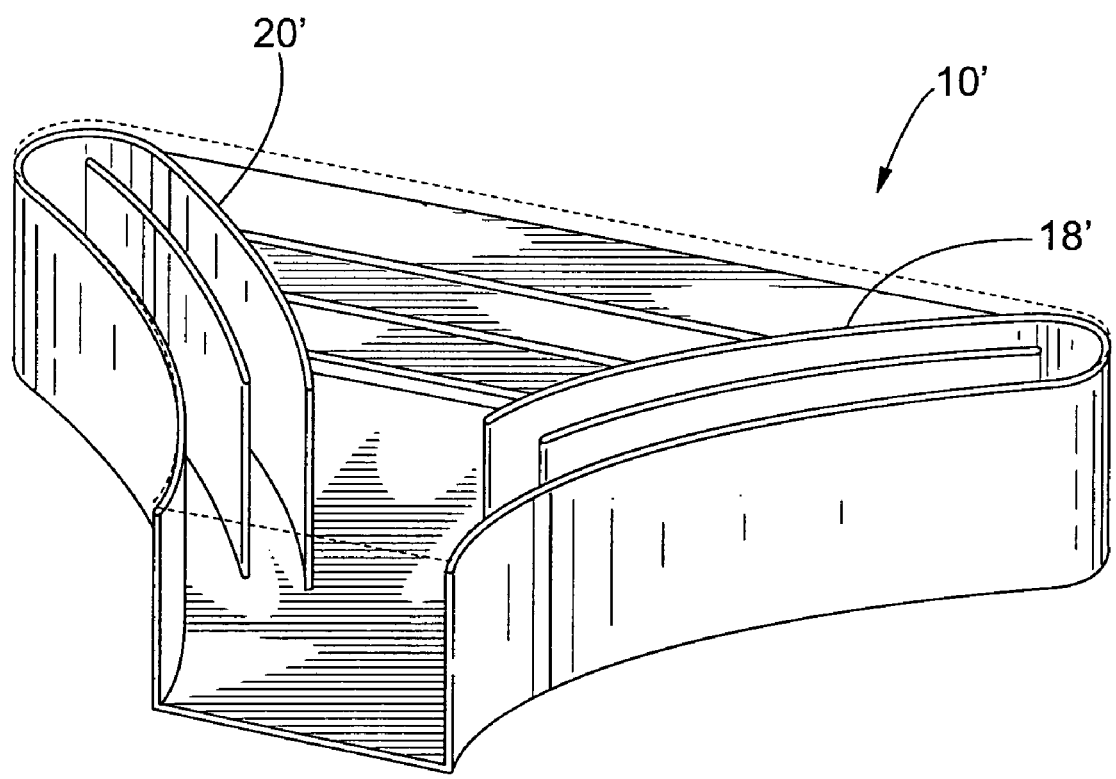
FIG. 4 is a perspective view of an air duct outlet according to embodiments of the present invention, wherein the side walls and return air passageways thereof have a generally convex configuration.

Referring to FIG. 2, the illustrated air duct outlet 10 includes a housing 12 having spaced-apart top and bottom walls 14, 16, and spaced-apart first and second side walls 18, 20. The side walls 18, 20 extend between the top and bottom walls 14, 16 to define an air passageway 22 that has an inlet 24 and outlet 26. In the illustrated embodiment, the side walls 18, 20 have generally linear portions 18a, 20a that diverge in a downstream direction to give the air passageway 22 a generally V-shaped configuration. According to embodiments of the present invention, side walls 18, 20 can have other configurations. For example, as illustrated in FIG. 4, the side walls 18', 20' of an air duct outlet 10' according to embodiments of the present invention can have convexly curved configurations.

Air flowing through the air passageway 22 from an air source has a natural tendency to adhere to one of the first or second side wall portions 18a, 20a as a result of the "Coanda effect." As known to those skilled in the art, the Coanda effect is the tendency for a moving fluid (either liquid or gas) to attach itself to a surface and flow along the surface. As a fluid moves across a surface a certain amount of friction occurs between the surface and the fluid, which tends to slow down the fluid as it moves across the surface. This resistance to flow tends to pull the fluid towards the surface, making it adhere to the surface, even as it bends around corners.

Figure 3:
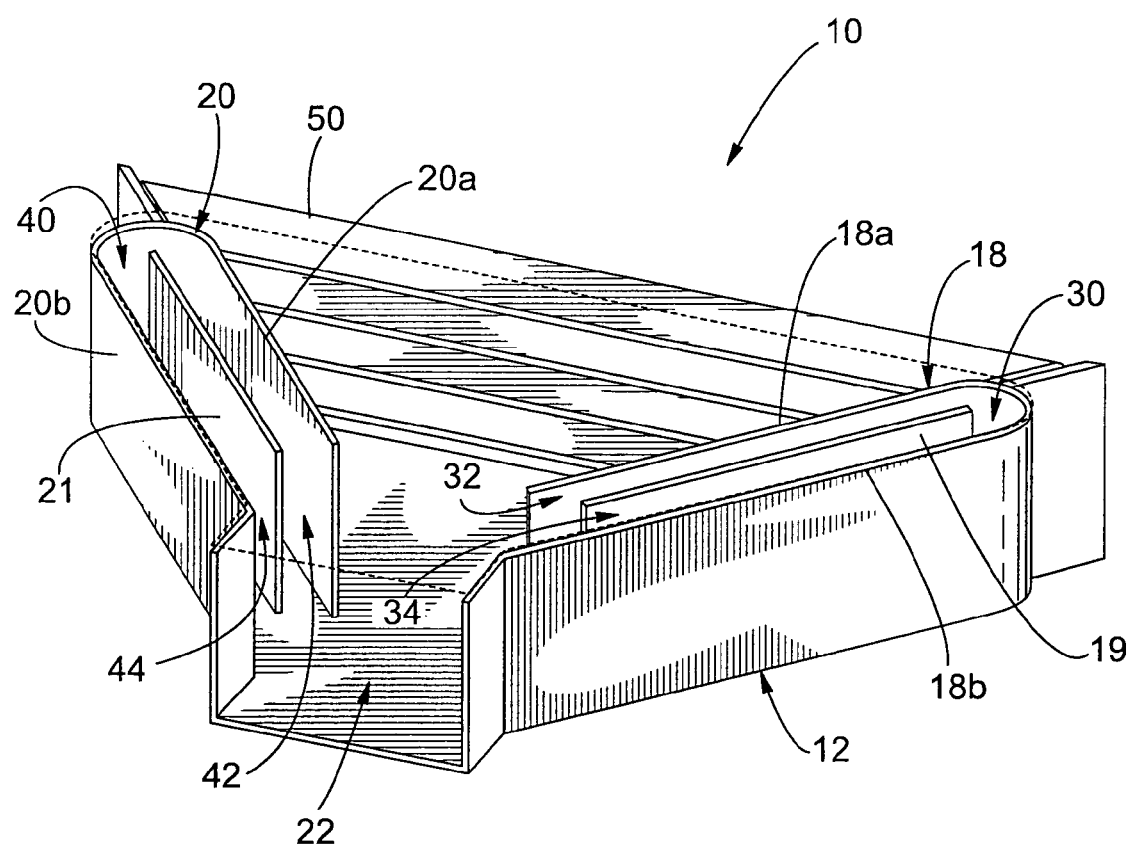
FIG. 3 is a perspective view of the air duct outlet of FIG. 1, with the housing top wall shown in phantom line for clarity, that illustrates the first and second air return passageways.

Referring to FIG. 3, the first side wall 18 has a generally U-shaped configuration. A first intermediate wall 19 is positioned between the portions 18a, 18b of the U-shaped first side wall 18, as illustrated. The first intermediate wall 19 and the U-shaped first side wall 18 define a first air return passageway 30 having an inlet 32 and an outlet 34 in communication with the air passageway 22. The outlet 34 is located upstream from the inlet 32, as illustrated. The first air return passageway 30 is configured to divert a portion of an air stream flowing through the air passageway 22 when the air stream is adhered to the first side wall portion 18a as a result of the Coanda effect, and then redirect this portion back into an upstream portion of the air stream at an angle substantially transverse to the direction of the air stream.

Similarly, the second side wall 20 has a generally U-shaped configuration. A second intermediate wall 21 is positioned between the portions 20a, 20b of the U-shaped second side wall 20, as illustrated. The second intermediate wall 21 and the U-shaped second side wall 20 define a second air return passageway 40 having an inlet 42 and an outlet 44 in communication with the air passageway 22. The outlet 44 is located upstream from the inlet 42, as illustrated. The second air return passageway 40 is configured to divert a portion of an air stream flowing through the air passageway 22 when the air stream is adhered to the second side wall portion 20a as a result of the Coanda effect, and then redirect this portion into an upstream portion of the air stream and at an angle substantially transverse to the direction of the air stream.

Figure 5:
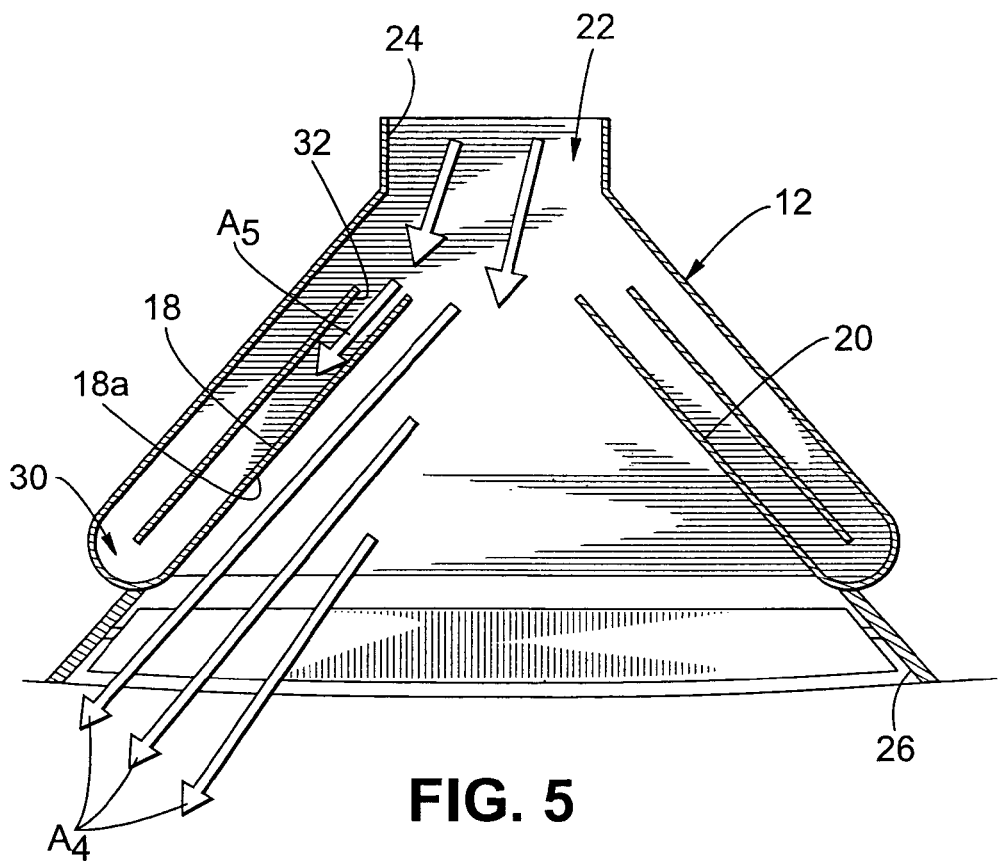
FIGS. 5–8 are top plan views of the air duct outlet of FIG. 3 that illustrate how the air return passageways cause an air stream flowing through the housing to oscillate.
Figure 6:
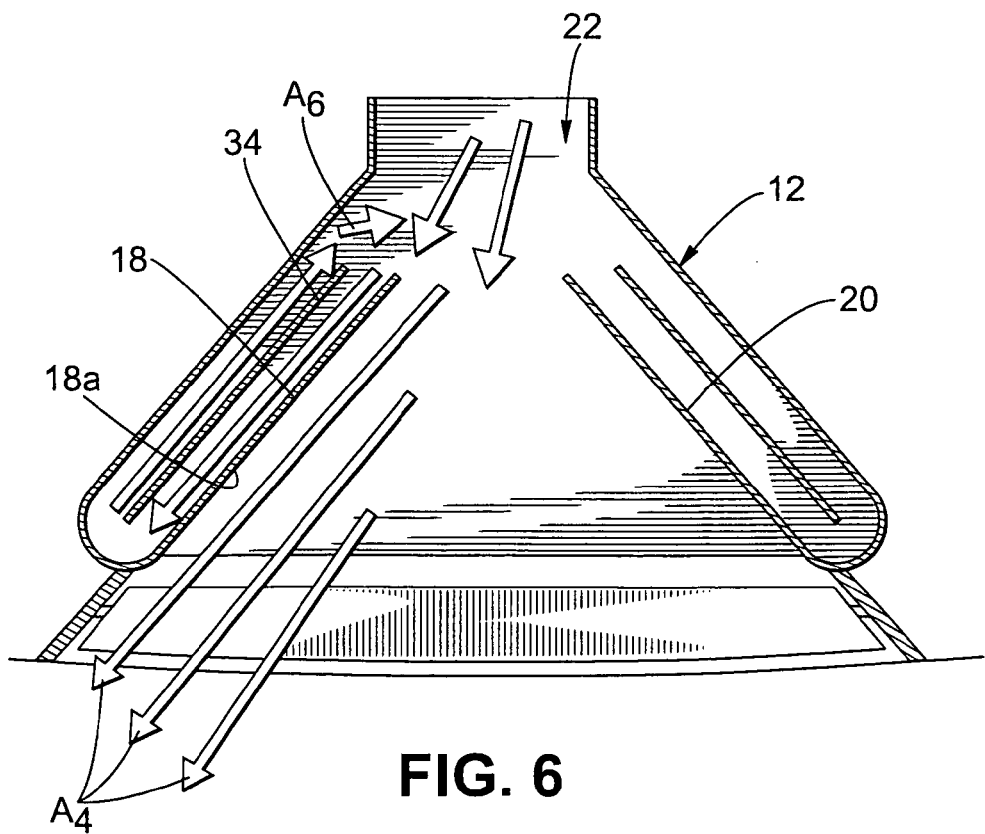

As illustrated in FIGS. 5–6, an air stream flowing through the air passageway 22 is adhering to the first side wall portion 18a and exits from the air passageway outlet 26 along a direction substantially parallel with the wall portion 18a, as indicated by arrows $A_4$. The majority of the air stream flows through the air passageway 22 and out via the air passageway outlet 26. However, a small portion of the air stream is diverted into the first return air passageway 30 via inlet 32, as indicated by arrow $A_5$. This diverted portion of the air stream is returned back into an upstream portion of the air stream and at an angle substantially transverse (indicated by arrow $A_6$) to the air stream direction. The force of this diverted air stream portion pushing on the air stream flowing through the passageway 22 causes the air stream to move toward the second side wall 20.

Figure 7:
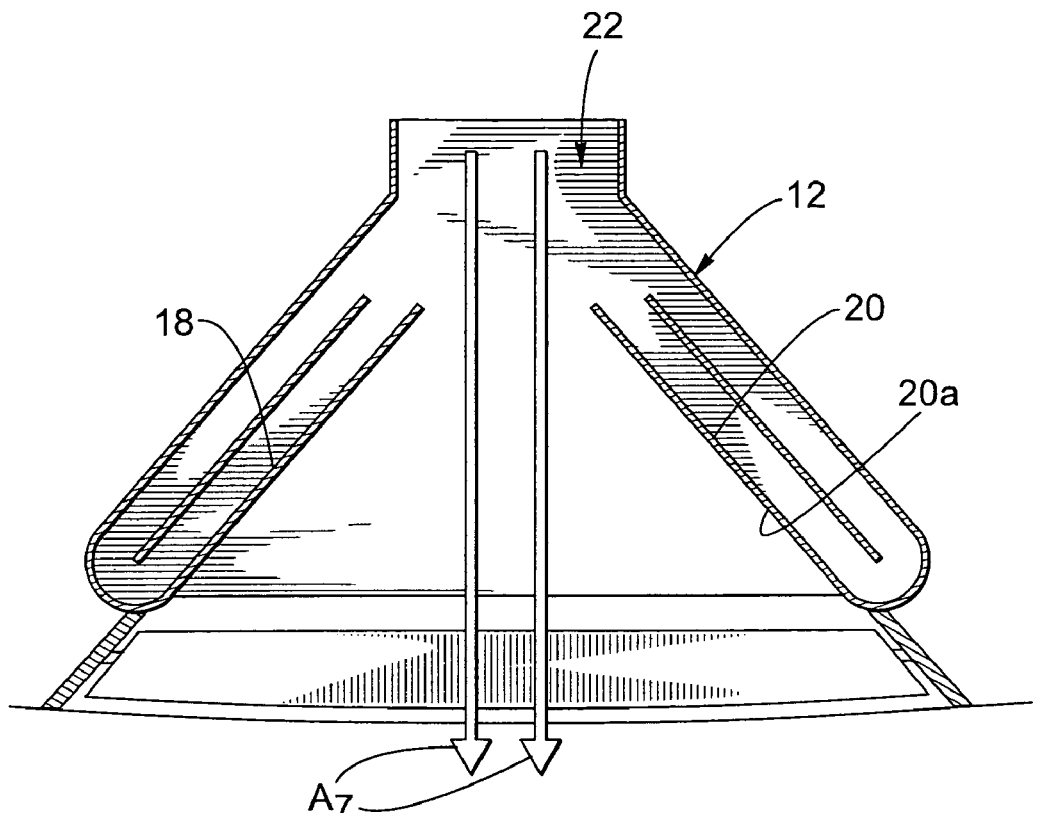
Figure 8:
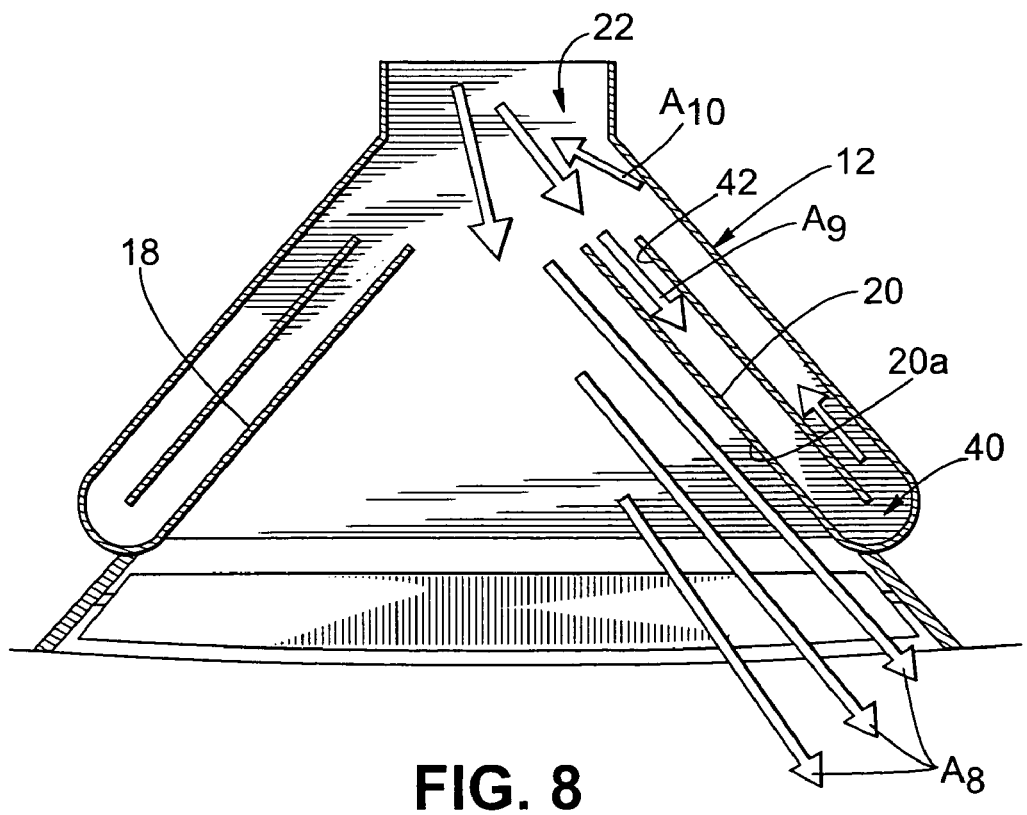

On its way to the second side wall 20 of the air passageway 22, the air stream exits from the air duct outlet 10 along a substantially straight direction, as illustrated by arrows $A_7$ in FIG. 7. In FIG. 8, the air stream has been pushed with sufficient force that the air stream adheres to the second side wall portion 20a. The majority of the air stream flows through the air passageway 22 and out via the air passageway outlet 26 along a direction substantially parallel with wall portion 20a, as indicated by arrows $A_8$. However, a small portion of the air stream is diverted into the second return air passageway 40 via inlet 42, as indicated by arrow $A_9$. This diverted portion of the air stream is returned back into an upstream portion of the air stream and at an angle substantially transverse (indicated by arrow $A_{10}$) to the air stream direction. The force of this diverted air stream portion pushing on the air stream causes the air stream to move back toward the first side wall 18.

The result of this continuous movement of the air stream as a result of the diversion of portions of an air stream through air return passageways 30, 40 is an air stream exiting from the air passageway outlet 26 with an oscillation, sweeping motion, and without requiring the need for oscillating louvers. The air duct outlet 10, according to embodiments of the present invention, creates a situation where airflow therethrough is not permanently stable on either side of the air passageway 22. An air stream flowing therethrough will continue to push itself away from one side and toward another side. In this way, the airflow oscillates in direction from one side to the other and thereby sweeping across the width of the air passageway 22.

The duration of each cycle (i.e., the time required for one complete oscillation of the air stream from first wall 18 to second wall 20), including the time required to push an air stream to the opposite side of the air passageway 22 can be controlled by adjusting various parameters of the first and second air return passageways 30, 40. For example, the air return passageways 30, 40 can have various cross-sectional configurations and can have various lengths. Moreover, the angle or bend of the air return passageways 30, 40 can have various configurations, angles, etc. Embodiments of the present invention are not limited to the illustrated configurations.

According to other embodiments of the present invention, tubes may be utilized in lieu of the illustrated air return passageways. Regardless of the design, the goal is to have a fluid-based mechanism, as opposed to a mechanical mechanism, which causes a sufficient disturbance to force the airflow to change the side that it is adhering to. According to embodiments of the present invention, a puff of air through a tube may be sufficient to force the airflow to change sides in air passageway 22.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An air duct outlet, comprising:
   a housing comprising spaced-apart top and bottom walls, and spaced-apart first and second U-shaped side walls extending between the top and bottom walls to define an air passageway having an inlet and outlet, and wherein the side walls diverge in a downstream direction;
   a first intermediate wall positioned relative to the first U-shaped side wall to define a first air return passageway, wherein the first air return passageway is configured to divert a first portion of an air stream flowing through the air passageway and to direct the diverted air stream first portion into the air passageway at a location between the inlet and outlet and at an angle substantially transverse to a direction of the air stream; and
   a second intermediate wall positioned relative to the second U-shaped side wall to define a second air return passageway, wherein the second air return passageway is configured to divert a second portion of an air stream flowing through the air passageway and to direct the diverted air stream second portion into the air passageway at a location between the inlet and outlet and at an angle substantially transverse to a direction of the air stream;
   wherein an oscillating, sweeping motion is imparted to the air stream flowing through the air passageway as a result of air being diverted by the first and second air return passageways.

2. The air duct outlet of claim 1, wherein the first and second side walls comprise linear portions.

3. The air duct outlet of claim 1, wherein the air passageway has a generally V-shaped configuration.

4. The air duct outlet of claim 1, wherein the first and second side walls comprise convexly curved portions.

5. The air duct outlet of claim 4, wherein an air stream flowing through the outlet is caused to oscillate within a range of between about +90° and −90° relative to a direction normal to the air passageway outlet.

6. The air duct outlet of claim 1, further comprising a louver assembly operably coupled with the housing adjacent the air passageway outlet, wherein the louver assembly is configured to adjust the direction of an air stream flowing through the air passageway.

7. An air duct outlet, comprising:
   a housing comprising spaced-apart top and bottom walls, and spaced-apart first and second side walls extending between the top and bottom walls to define an air passageway having an inlet and outlet, and wherein the side walls diverge in a downstream direction;
   a first air return passageway adjacent the first side wall, wherein the first air return passageway is configured to divert a first portion of an air stream flowing through the air passageway and to direct the diverted air stream first portion into the air passageway at a location between the inlet and outlet and at an angle substantially transverse to a direction of the air stream; and
   a second air return passageway adjacent the second side wall, wherein the second air return passageway is configured to divert a second portion of an air stream flowing through the air passageway and to direct the diverted air stream second portion into the air passageway at a location between the inlet and outlet and at an angle substantially transverse to a direction of the air stream.
   wherein the first and second air return passageways each comprise a respective tube having a respective inlet arid outlet in communication with the air passageway, and wherein each tube outlet is located upstream from a respective tube inlet.

8. The vehicle of claim 7, wherein the first and second side walls comprise linear portions.

9. The vehicle of claim 7, wherein the air passageway has a generally V-shaped configuration.

10. The vehicle of claim 7, wherein the first and second side walls comprise convexly curved portions.

11. The vehicle of claim 10, wherein an air stream flowing through the outlet is caused to oscillate within a range of between about +90° and −90° relative to a direction normal to the air passageway outlet.

12. The vehicle of claim 7, further comprising a louver assembly operably coupled with the housing adjacent the air passageway outlet, wherein the louver assembly is configured to adjust the direction of an air stream flowing through the air passageway.

* * * * *

UNITED STATES PATENT AND TRADEMARK OFFICE
CERTIFICATE OF CORRECTION

| | |
|---|---|
| PATENT NO. | : 7,195,555 B2 |
| APPLICATION NO. | : 11/047262 |
| DATED | : March 27, 2007 |
| INVENTOR(S) | : Gehring et al. |

It is certified that error appears in the above-identified patent and that said Letters Patent is hereby corrected as shown below:

On Title Page,

Please insert --(60) Related U.S. Application Data: Provisional Application No. 60/542,152, filed February 5, 2004--

Signed and Sealed this

Twelfth Day of June, 2007

JON W. DUDAS
*Director of the United States Patent and Trademark Office*